United States Patent [19]

Dänekas et al.

[11] Patent Number: 5,092,282
[45] Date of Patent: Mar. 3, 1992

[54] EVAPORATION COOLING SYSTEM FOR AN INTERNAL COMBUSTION ENGINE

[75] Inventors: Gerfried Dänekas, Brunswick; Kurt Hiestermann, Tappenbeck; Hans-Peter Jaekel, Frellstedt; Knut Milbradt, Garbsen; Krystof Papierski, Wolfsburg; Hans-Jürgen Schäfer, Brunswick; Herbert Schäpertöns, Gifhorn; Bodo Scheibner, Wolfsburg; Walter Werner, Müden/Ettenbüttel; Joachim Meier-Grotian, Salzgitter, all of Fed. Rep. of Germany

[73] Assignee: Volkswagen AG, Wolfsburg, Fed. Rep. of Germany

[21] Appl. No.: 713,710

[22] Filed: Jun. 11, 1991

[30] Foreign Application Priority Data

Jun. 21, 1990 [DE] Fed. Rep. of Germany ....... 4019786

[51] Int. Cl.$^5$ ............................................... F01P 9/02
[52] U.S. Cl. ............................... 123/41.21; 123/41.25
[58] Field of Search ................. 123/41.2, 41.21, 41.23, 123/41.25, 41.27, 41.5, 41.51

[56] References Cited

U.S. PATENT DOCUMENTS

| | | | |
|---|---|---|---|
| 2,518,621 | 8/1950 | Hull et al. | 123/41.21 |
| 2,735,414 | 3/1956 | Tacchella | 123/41.25 |
| 4,367,699 | 1/1983 | Evans | 123/41.21 |
| 4,622,925 | 11/1986 | Kubozuka | 123/41.25 |

FOREIGN PATENT DOCUMENTS

| | | |
|---|---|---|
| D. 3809136 | 10/1988 | Fed. Rep. of Germany. |
| 3339717 | 1/1990 | Fed. Rep. of Germany. |
| 411950 | 6/1934 | United Kingdom ............. 123/41.25 |

*Primary Examiner*—Noah P. Kamen
*Attorney, Agent, or Firm*—Brumbaugh, Graves, Donohue & Raymond

[57] ABSTRACT

In the embodiment disclosed in the specification an evaporation cooling system for an internal combustion engine heat exchanger avoids valves or the like by providing a liquid-vapor separator in the vapor line between the engine and the main condenser and a bypass line for liquid coolant which bypasses the main condenser leading to a condensate line having a pump. When the temperature of the engine is high enough for coolant to vaporize, the vapor passes through the vapor line and the separator to the main condenser. A heat exchanger for a vehicle heater is disposed in the condensate line so that it always receives all of the coolant in circulation.

8 Claims, 2 Drawing Sheets

EVAPORATION COOLING SYSTEM FOR AN INTERNAL COMBUSTION ENGINE

BACKGROUND OF THE INVENTION

This invention relates to evaporation cooling systems for internal combustion engines.

German Patent 3,339,717 discloses an evaporation cooling system in which an individual heating circuit having a circulation pump and a heat exchanger is connected to the cooling chambers of the engine to heat the passenger compartment of a motor vehicle equipped with the engine. Since a condensate pump is as a general rule also required in the condensate line of the engine cooling circuit, this separation of vehicle heating and engine cooling circuits involves considerable expense, especially in terms of the separate pumps. Also, since only a portion of the coolant circulates through the vehicle heater, the effectiveness of the heater is limited when the engine is operating with little exhaust heat, as generally occurs in high-efficiency engines.

On the other hand, the above-described evaporation cooling system is advantageous because it is a closed system, so that escape of the coolant to the atmosphere is avoided, thus maintaining the quality of the coolant and protecting the environment. Also, the fact that the evaporation cooling system or its components are only partially filled with liquid coolant when the engine is cold permits consistent application of the principle of evaporation cooling. Thus, at least one compensation tank with a bladder providing an elastically yielding wall is included to accommodate air displaced by the evaporated coolant, but not the coolant itself.

This advantage of complete separation of the coolant-filled chambers and lines from the environment is not provided by the evaporation cooling systems disclosed in U.S. Pat. No. 4,367,699. Those systems include air and vent lines which open, by way of valves if required, to the atmosphere rather than opening into compensation tanks which are sealed off from the environment. If a heat exchanger for a vehicle heater is provided, it is included in the vapor line extending between the engine and the condenser, and consequently it becomes effective only after evaporation of the coolant. To expedite warm-up of the cold engine, an additional warm-up circuit for liquid coolant having a electric pump controlled by the liquid coolant temperature is connected directly to the cooling chambers of the engine. Hence the devices disclosed in that patent involve a considerable expense requiring, for example, still another pump in the warm-up circuit in addition to the pump in the condensate line.

A more elegant solution is described in German Offenlegungsschrift No. 38 09 136. Here again, there is a system for evaporation cooling, and when the engine is warm, a heating circuit for a vehicle heater containing a coolant pump and a heat exchanger forms an auxiliary condenser, branching off the main condenser. In this known system, which requires a large volume of coolant because the several components are completely flooded, the heat exchanger thus receives both liquid and vaporized coolant. In this arrangement, however, the provision of a small capacity heating circuit and a large capacity cooling circuit requires a switching system and appropriate controls.

SUMMARY OF THE INVENTION

Accordingly, it is an object of the present invention to provide an evaporation cooling system which overcomes the above-mentioned disadvantages of the prior art.

Another object of the invention is to provide an evaporation cooling system in which, when the engine is warm, a small capacity heater circuit including a heat exchanger is provided and the main condenser is rendered inoperative and, even when not much exhaust heat is available from the engine, a high efficiency of the heat exchanger is achieved.

These and other objects of the invention are attained by providing an evaporation cooling system for an internal combustion engine having a coolant outlet line which carries liquid as well as vaporized coolant from the engine, a separator for separating liquid from vaporized coolant leaving the engine through the outlet line, a bypass line for carrying liquid coolant from the separator which bypasses a main condenser for the cooling system and supplies liquid coolant to a condensate line leading from the main condenser, and a heat exchanger for a vehicle heater receiving heated liquid coolant from the condensate line.

An important feature of the invention is that the bypass line on the one hand and the main condenser on the other are rendered operative without the aid of any valve, solely by virtue of the coolant pressure and liquid weight conditions that become established. As soon as liquid coolant has passed through the vapor line, it enters the bypass line, bypassing the condenser, and continues into the condensate line, from which it is pumped back to the engine by the condensate pump. When the temperature of the engine has risen far enough so that an appreciable evaporation of the coolant occurs, the coolant vapor flows through the vapor line, passes above the bypass line, and thus enters the condenser. Regardless of whether the condenser is thus rendered operative or not, the heated liquid coolant will pass through the vehicle heater heat exchanger, which consequently always receives all of the coolant in circulation and therefore is highly effective. Intricate heat changer designs for heating the vehicle when the engine is not hot can thus be avoided.

BRIEF DESCRIPTION OF THE DRAWINGS

Further object and advantages of the invention will be apparent from a reading of the following description in conjunction with the accompanying drawings, in which.

DESCRIPTION OF THE PREFERRED EMBODIMENTS

Figure 1:
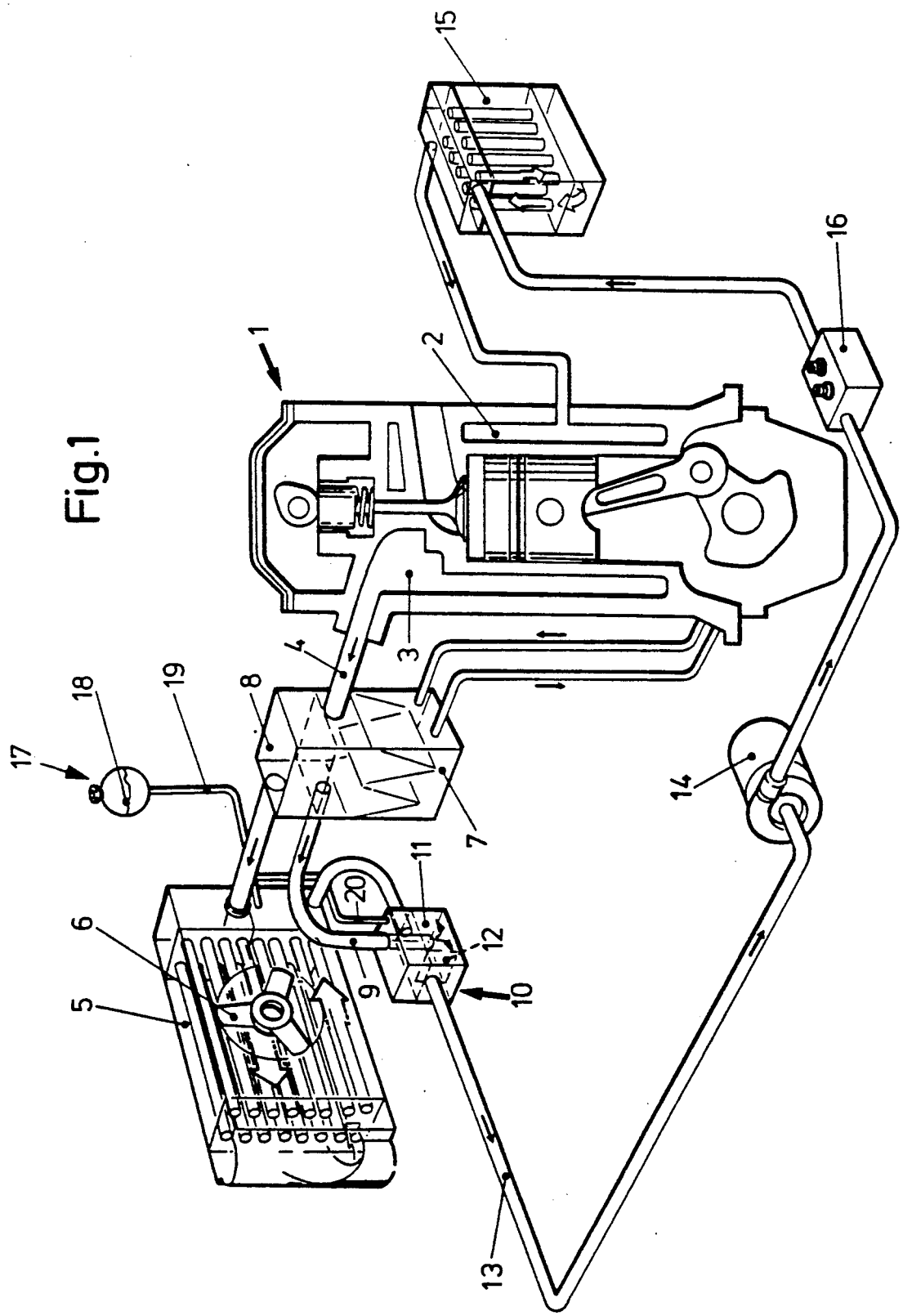
FIG. 1 is a schematic perspective view illustrating a representative embodiment of an evaporation cooling system in accordance with the invention.

In the typical embodiment of the invention shown in FIG. 1, an internal combustion engine 1 has cooling chambers 2 and 3 which are in flow communication. These chambers may, of course, be provided either in the engine block or in the cylinder head. From the cooling chambers 2 and 3 a vapor line 4, with an at least partially declining orientation, leads to a main condenser 5 which is arranged with a fan 6 in a conventional manner. Disposed in the vapor line 4 are an evaporation oil cooler 7 and a liquid-vapor separator 8 which has a liquid outlet leading to a bypass line 9 bridging the main condenser 5 so as to permit liquid coolant to bypass it. The bypass line 9 opens into a mixer tank 10 at a location below the liquid level 11 therein so that, in combination with at least one internal baffle 12, the condensate line 13 is adequately supplied with condensate, i.e., coolant condensed in the condenser, by a condensate pump 14, even at a high transverse acceleration of a motor vehicle equipped with the engine. The condensate pump 14 may be arranged to continue operation after the engine has been shut off.

The engine cooling and vehicle heating circuit is completed by the vehicle heater heat exchanger 15, which is of conventional design which therefore need not be described in detail. The heater 15 is disposed between a transmission oil cooler 16 in the condensate line 13 and the end of the condensate line leading into the cooling chambers 2 and 3 of the engine. The oil cooler 16 serves to cool the oil in an oil circuit associated with the engine 1.

As previously explained, the essential components of the system, i.e., the cooling chambers 2 and 3, the separator 8 and the condenser 5 in the illustrated embodiment, are not completely filled with liquid coolant when the engine is cold, but contain liquid coolant only to the extent of about 40% to 90% of their volume. This means that the cooling system, being closed from the atmosphere as described, is supplementarily filled with air, which upon heating of the coolant, especially upon evaporation thereof, is forced out of the partially filled chambers of the components. The displaced air is then transferred to a compensation tank 17, which is divided by a diaphragm 18 into two compartments of complementarily variable volume. FIG. 1 illustrates the situation when the engine is warm, i.e., when the coolant is vaporized. In this case, the chamber located beneath the diaphragm is filled with air as shown in the drawing. When the engine is cold, on the other hand, the air is drawn back into the cooling circuit and the diaphragm may be in contact with the lower wall of the compensation tank 17.

The compensation tank 17 is in communication through air or vent lines 19 and 20, respectively, with those partial volumes of the main condenser 5 and the mixer 10 which are not filled with coolant liquid when the engine is cold. The vent line 20 ensures delivery of bubble-free liquid coolant to the pump 14.

Figure 2:
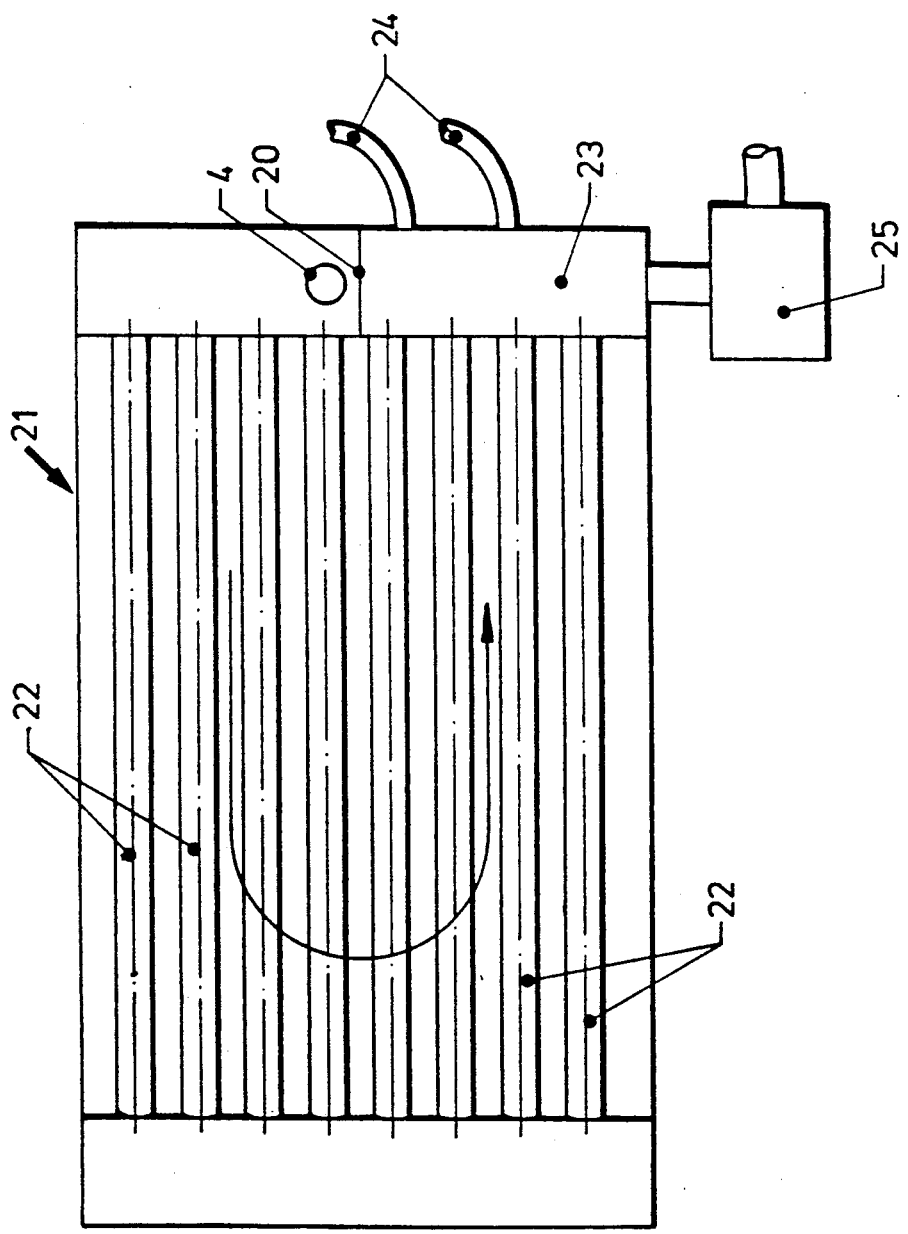
FIG. 2 is an elevation view illustrating one possible configuration for the main condenser shown in FIG. 1.

The cooling system may be filled with liquid coolant from a central location when the engine is cold, for example from the cylinder head cover. To assure that a volume of air will remain in the main condenser, thus ensuring a partial "flooding" thereof, the vapor line may expediently open into the central or lower region of the condenser. This arrangement is illustrated in FIG. 2, which shows a convenient condenser configuration. The vapor line 4 enters a condenser 21 which contains transverse tubes 22 immediately above a partition 20. The tubes located above the partition 20 carry coolant from right to left as viewed in FIG. 2, and the tubes below the partition carry coolant from left to right as indicated by the arrow. Thus, there is a change of coolant flow direction. When the coolant enters a lower head 23 of the condenser, liquid coolant in that part forces the air that had previously remained in the condenser when the condenser 21 was filled by way of the line 4, through the vent lines 24 to the compensation tank 17 shown in FIG. 1.

The condensate passes into a mixer tank 25, corresponding to the tank 10 of FIG. 1, and then flows to the condensate pump, which may be integrated with the mixer tank, if desired.

While it may be expedient for reasons of safety, for example, to provide a check valve in the flow direction behind the condensate pump so as to ensure emergency cooling in the event of pump failure, it will be clear that the evaporation cooling system according to the invention achieves all its advantageous properties solely by utilizing pressure or flow conditions. In other words no special thermostatically controlled switching means are required.

Although the invention has been described herein with reference to specific embodiments, many modifications and variations therein will readily occur to those skilled in the art. Accordingly all such variations are intended to be included within the scope of the invention.

We claim:

1. An evaporation cooling system for an internal combustion engine which is isolated from the atmosphere comprising main condenser means for condensing vaporized coolant, the condenser means being only partly filled with liquid coolant when the engine is cold and being complementarily filled with air, a vapor line extending between cooling chambers in the engine and the main condenser means, separator means in the vapor line between the engine and the main condenser means for separating liquid coolant from vaporized coolant, a condensate line for carrying liquid coolant means from the condenser means to the engine cooling chambers, at least one compensation tank containing an elastically yielding wall to accommodate air displaced by the evaporated coolant from cooling circuit components during vehicle heater operation of the engine, at least one heat exchanger receiving liquid coolant from the condensate line, at least one vent line leading from a cooling system component to the compensation tank, the vapor line between the cooling chambers of the engine and the main condenser means branching off from the cooling chambers at a level ensuring that it carries heated liquid coolant as well as vaporized coolant, and a bypass line for liquid coolant extending between the liquid outlet of the separator and the condensate line to bridge the main condenser means.

2. An evaporation cooling system according to claim 1 including a mixer tank in the condensate line receiving liquid coolant from the bypass line and a condensate pump in the condensate line receiving liquid coolant from the mixer tank.

3. An evaporation cooling system according to claim 2 wherein the mixer tank includes at least one perpendicular baffle disposed between the condenser line and bypass line inputs to the mixer tank and the output from the mixer tank to the condenser line, which terminates near the bottom of the mixer tank.

4. An evaporation cooling system according to claim 1 including a transmission oil cooler for cooling oil from a transmission associated with the engine, the oil cooler being located in the condensate line preceding the vehicle heater heat exchanger in the direction of coolant flow.

5. An evaporation cooling system according to claim 1 including a coolant-evaporative oil cooler combined with the separator means.

6. An evaporation cooling system according to claim 1 wherein the vapor line extends at least partially downwardly in the direction from the engine toward the main condenser means and opens into a region below the upper region thereof.

7. An evaporation cooling system according to claim 6, wherein the main condenser means has horizontal flow paths in which the direction of flow is reversed, and including at least one vent line which is connected to the main condenser means below the vapor line and including a baffle in the main condenser means between the vent and the vapor line.

8. An evaporation cooling system according to claim 1 including an electric condensate pump in the condensate line arranged to continue pumping condensate after the engine has been switched off.

* * * * *